(12) United States Patent
Meller

(10) Patent No.: US 7,821,149 B2
(45) Date of Patent: *Oct. 26, 2010

(54) AIRBORNE STABILIZED WIND TURBINES SYSTEM

(76) Inventor: Moshe Meller, 8 Balfur St., Tel Aviv (IL) 85213

( * ) Notice: Subject to any disclaimer, the term of this patent is extended or adjusted under 35 U.S.C. 154(b) by 0 days.

This patent is subject to a terminal disclaimer.

(21) Appl. No.: 12/634,499

(22) Filed: Dec. 9, 2009

(65) Prior Publication Data

US 2010/0117363 A1     May 13, 2010

Related U.S. Application Data

(63) Continuation-in-part of application No. 12/284,046, filed on Sep. 18, 2008, now Pat. No. 7,709,973.

(51) Int. Cl.
*F03D 9/00* (2006.01)
*H02P 9/04* (2006.01)

(52) U.S. Cl. .......................................... 290/44; 290/55

(58) Field of Classification Search .................... 290/43, 290/44, 54, 55; 415/2.1, 4.2, 4.5, 4.3, 7; 60/398; 416/132 B, 84; 244/30, 153 R
See application file for complete search history.

(56) References Cited

U.S. PATENT DOCUMENTS

| | | |
|---|---|---|
| 4,073,516 A | 2/1978 | Kling |
| 4,084,102 A | 4/1978 | Fry et al. |
| 4,165,468 A | 8/1979 | Fry et al. |
| 4,166,569 A | 9/1979 | Begnaud et al. |
| 4,166,596 A | 9/1979 | Mouton et al. |
| 4,219,303 A | 8/1980 | Mouton et al. |

(Continued)

FOREIGN PATENT DOCUMENTS

JP     57070964 A     5/1982

(Continued)

OTHER PUBLICATIONS

U.S. Appl. No. 12/772,736; First Named Inventor: Moshe Meller; Title: "Wind Turbine Electricity Generating System", Filed: May 3, 2010.

(Continued)

*Primary Examiner*—Julio Gonzalez Ramirez
(74) *Attorney, Agent, or Firm*—Holtz, Holtz, Goodman & Chick, PC

(57) ABSTRACT

Airborne system for producing electricity from wind includes at least one shaft, one or more wind turbines rotatably mounted to each shaft, and generators that convert rotation of the turbine(s) into electricity. A lifting section is connected to the shaft(s) and generates a lifting force that causes the system to be airborne. A center of gravity of the system is lower than its center of lift. When the turbines are exposed to wind and rotate (at least one in one direction and another in an opposite direction), torques induced on the shaft(s) of the system balance each other and remaining deferential torque is balanced by returning torque that is generated by the angular deviation of the center of gravity from its lowest position. A magnitude of this returning torque increases as the angular deviation increases until the system reach angular stability. Electricity is generated and conducted for storage or usage.

15 Claims, 10 Drawing Sheets

U.S. PATENT DOCUMENTS

| | | | |
|---|---|---|---|
| 4,285,481 A | 8/1981 | Biscomb | |
| 4,309,006 A | 1/1982 | Biscomb | |
| 4,350,898 A | 9/1982 | Benoit | |
| 4,350,899 A | 9/1982 | Benoit | |
| 4,358,243 A | 11/1982 | Heath | |
| 4,383,182 A | 5/1983 | Bowley | |
| 4,450,364 A | 5/1984 | Benoit | |
| 4,470,563 A | 9/1984 | Engelsman | |
| 4,491,739 A | 1/1985 | Watson | |
| 4,495,423 A | 1/1985 | Rogers | |
| 4,547,124 A | 10/1985 | Kliatzkin et al. | |
| 4,572,962 A | 2/1986 | Shepard | |
| 5,040,948 A | 8/1991 | Harburg | |
| 5,062,765 A | 11/1991 | McConachy | |
| 5,506,453 A | 4/1996 | McCombs | |
| 5,798,632 A | 8/1998 | Muljadi | |
| 6,091,161 A | 7/2000 | Dehlsen et al. | |
| 6,127,739 A | 10/2000 | Appa | |
| 6,278,197 B1 | 8/2001 | Appa | |
| 6,492,743 B1 | 12/2002 | Appa | |
| 6,781,254 B2 | 8/2004 | Roberts | |
| 6,945,747 B1 | 9/2005 | Miller | |
| 7,129,596 B2 | 10/2006 | Macedo | |
| 7,183,663 B2 | 2/2007 | Roberts et al. | |
| 7,309,930 B2 | 12/2007 | Suryanarayanan et al. | |
| 7,317,261 B2 | 1/2008 | Rolt | |
| 7,335,000 B2 | 2/2008 | Ferguson | |
| 7,384,239 B2 | 6/2008 | Wacinski | |
| 7,489,046 B2 | 2/2009 | Costin | |
| 7,582,981 B1 * | 9/2009 | Meller | 290/44 |
| 7,709,973 B2 * | 5/2010 | Meller | 290/55 |
| 2006/0251505 A1 | 11/2006 | Ferguson | |
| 2007/0228738 A1 | 10/2007 | Wrage et al. | |
| 2008/0023964 A1 | 1/2008 | Sureshan | |
| 2008/0048453 A1 | 2/2008 | Amick | |
| 2008/0296905 A1 | 12/2008 | Ferguson | |
| 2009/0152391 A1 | 6/2009 | McWhirk | |
| 2010/0032947 A1 | 2/2010 | Bevirt | |
| 2010/0032948 A1 | 2/2010 | Bevirt | |
| 2010/0032949 A1 | 2/2010 | Varrichio et al. | |
| 2010/0066095 A1 * | 3/2010 | Meller | 290/55 |

FOREIGN PATENT DOCUMENTS

| | | |
|---|---|---|
| JP | 2161173 A | 6/1990 |
| WO | WO 2007/051034 A2 | 5/2007 |

OTHER PUBLICATIONS

U.S. Appl. No. 12/465,877, entitled "Airborne Stabilized Wind Turbines System" Inventor: Moshe Meller.

* cited by examiner

AIRBORNE STABILIZED WIND TURBINES SYSTEM

CROSS-REFERENCE TO RELATED APPLICATIONS

The present application is a continuation-in-part of U.S. patent application Ser. No. 12/284,046 filed Sep. 18, 2008 now U.S. Pat. No. 7,709,973, and is related to U.S. patent application Ser. No. 12/465,877 filed May 14, 2009 which is a divisional of the '046 application, both of which are incorporated herein by reference.

FIELD OF THE INVENTION

The present invention relates generally to a wind turbine system for generating electricity and more specifically to a wind turbine system for generating electricity which is airborne, and includes both turbine and generator on a common, airborne structure.

BACKGROUND OF THE INVENTION

Wind energy is one of the most readily available forms of renewable energy, which include solar, hydro, geothermal energy, and is therefore often used to generate electricity. The density of wind energy, in terms of watts per square meter, is one of the highest among other forms of renewable energy.

Existing systems for utilizing wind energy to generate electricity have certain disadvantages. For example, since wind velocity generally increases with altitude and a large wind velocity is critical to optimize wind-based electricity generation, tall towers must be constructed to elevate a wind turbine to a high operational altitude in order to maximize the potential to generate electricity from the wind. However, tall towers are expensive to build and once built, are subject to intense vibrations during operation. Furthermore, land for building the towers to support such wind turbines is limited in view of numerous, known factors, including acquisition costs, environmental impact, zoning issues.

Although offshore winds, i.e., winds over bodies of water, are stronger than winds over land, the construction of support structures for wind turbines over a body of water is expensive, although there are significantly fewer limitations on the space for building support structures over such bodies of water. The most notable limitation is that the construction of support structures for wind turbines is limited to certain depths of the bodies of water.

In view of the problems with installing wind-based electricity generating systems over land or bodies of water, flying windmills have been developed. Generally, such flying windmills do not require an extensive support structure connected to land or otherwise anchored over a body of water. One such flying windmill is the well-known Magenn system, which is lighter than air, and utilizes the Magnus effect. A drawback of this prior art system is that its power generation is very limited and it is not very efficient.

Another flying windmill currently under development is a flying electric generator, by Sky Wind Power Company. This system is heavier than the air and attempts to utilize the wind in the upper level of the atmosphere. Among its drawbacks are that it is expensive to construct, includes complex mechanical parts and is not very practical.

It would therefore be desirable to provide an airborne wind turbine, electricity-generating system, which overcomes the drawbacks of the systems mentioned above.

OBJECTS AND SUMMARY OF THE PRESENT INVENTION

It is an object of the present invention to provide a new and improved system and method for generating electricity from wind at different altitudes.

It is an object of the present invention to provide a system for generating electricity from wind which will be angularly stable while being airborne.

In order to achieve these objects and possibly others, a system for producing electricity from wind in accordance with the invention includes at least one shaft, at least one turbine section each including at least one wind turbine that can rotate relative to a respective one of the at least one shaft when exposed to a wind; and a plurality of generators each associated with one of the wind turbines and arranged to convert rotation of the wind turbine into electricity. The system also includes a lifting section, connected to the at least one turbine section for generating a lifting force to enable the entire system to be airborne at a desired altitude. The system is preferably connected by a tether to an anchoring section. The electricity generated by the generators is conducted to usage or energy storage on the system itself and/or to a ground location via the anchoring system or another cabling system. The anchoring system can include a winch that can control the operational altitude of the system.

The amount of power that can produce by the system of the present invention is proportional to the multiplication of the torque that the wind turbine induces on the system by the angular velocity of the turbine; power=torque×angular velocity. As the diameter of a high power wind turbine is very large, the angular velocity of the turbine is relatively low, and therefore, the torque that the turbine induces on the system through the generator is very high. In order to keep the angular stability of the system, it is preferable to provide a balancing torque which will balance the torque that the wind turbine is inducing on the system while operating, this balancing torque must be equal to the wind turbine's torque, and in an opposite direction. Without the balancing torque, the whole system might be rolling angularly in the direction of the wind turbine rotation and little or no electricity can be generated.

An important object of the system of the present invention is to provide the balancing torque to the airborne wind turbine system.

In order to continue this description of the present invention, two expressions will be defined:
CENTER of GRAVITY; and: CENTER of LIFT of stationary floating body;

Center of Gravity of a body, defined as the point in or near a body at which the gravitational potential energy of the body, is equal to that of a single particle of the same mass (as the body), located at the same point and through which the resultant of the gravitational forces on the component particles of the body act.

Another word, the Center of Gravity is a point that if all the mass elements of the body will be concentrated in this point, the same physical status of the body would result.

Center of Lift of a stationary floating body, defined as the point in or near the body, that if all the partial lifting forces acting on the floating body will be concentrated in this point, the same physical status of the body will result.

In one version of the invention, the at least one turbine section (which includes the main shaft, the generator and the transmission) is attached to two inflated lighter than air bodies, one in front of the turbine section and the second behind the turbine section. In this version of the invention, the respective shaft of that turbine section and the generator are placed below the center of the inflated lighter than air bodies in a way that the center of gravity of the system is lower than the center of lift of the system. When the turbine is not rotating, the system will positioned itself in a way that the center of gravity is vertically below the center of lift of the system (like a pendulum), and when the turbine start to rotate, torque will induce on the system and the system will start to rotate in the same direction of the turbine. By this rotation, the angular position of the center of gravity will change, and angle will opened between the line that connects the center of gravity point with the center of lift point and the vertical direction; this angle will be called alpha. A returning torque will act on the system (as the returning torque acting on pendulum). The returning torque will be called RT.

$RT = mg \times d \times Sine\ Alpha;$ wherein m is the mass of the system;

g is the gravity;

d is the distance between the center of gravity and the center of lift;

the maximum returning torque:

$RT\ max = mg \times d \times 1\ (Sine\ 90 = 1).$

The torque that the wind turbine induces on the system will be called WT; If WT<mg×d, the system will reach equilibrium when 0<angle Alpha<90.

In another version of the invention, one end of the at least one turbine section is connecting by a tether to the lifting section; and the other end of that turbine section, by another tether to the anchoring section. The line between the two points of the turbine section that are connected to these two tethers will be called the Line of Tension. The system is constructed in a way that the center of gravity of the system is lower than the Line of Tension. When the wind turbine is not rotating, the system will bring itself to a position where the center of gravity will be vertically in the lowest possible position relative to the Line of Tension, (like a pendulum). When the wind will blow through the turbine, the turbine will rotate and will induce rotational torque on the system, the system will start to rotate to the same direction of the turbine; by this rotation of the system, the angular position of the center of gravity will change; and angle will be opened between the plane that connect the center of gravity point with the Line of Tension, and the vertical plane that is crossing the line of Tension. This angle will be called Alpha. A returning torque will act on the system (as the returning torque that acts on a pendulum). This returning torque will be called again RT, the calculations are the same as the above; the only different is that d will be the distance between the center of gravity point and the Line of Tension.

$RT = mg \times d \times Sine\ Alpha;$ $RT\ max = mg \times d \times 1;$ and if WT<mg×d the system will reach equilibrium; when 0<angle Alpha<90.

In another version of the invention, the turbine section will include more than one wind turbine, these turbines are constructed in a way that when the wind is blowing through them they will rotate in opposite directions; therefore each one of the turbines will induce rotational torque on the system in opposite directions. These opposite rotational torques will balance each other; but in order to avoid the rotating of the whole system the result of the torques acting on the system, must be zero, achieving zero torques result, requires a very accurate and complicated angular controller. This angular controller should continuously control the angle of attack of the wind turbines blades, the power that produced by the generators of the system and other things that can influence the magnitude of the torque that each turbine inducing on the system. The alternative to this complicated angular controller is system that utilizing the principle of the present invention in the same way as described above. The only different in this type of system with more than one wind turbine, is that the required returning torque RT needs to balance only the differential unbalanced torque that has not been balanced by the opposite rotating turbines. And, this can be achieved in low cost and in simple and reliable way, using the principle of the present invention.

Other and further objects, advantages and features of the present invention will be understood by reference to the following specification in conjunction with the annexed drawings, wherein like parts have been given like numbers.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
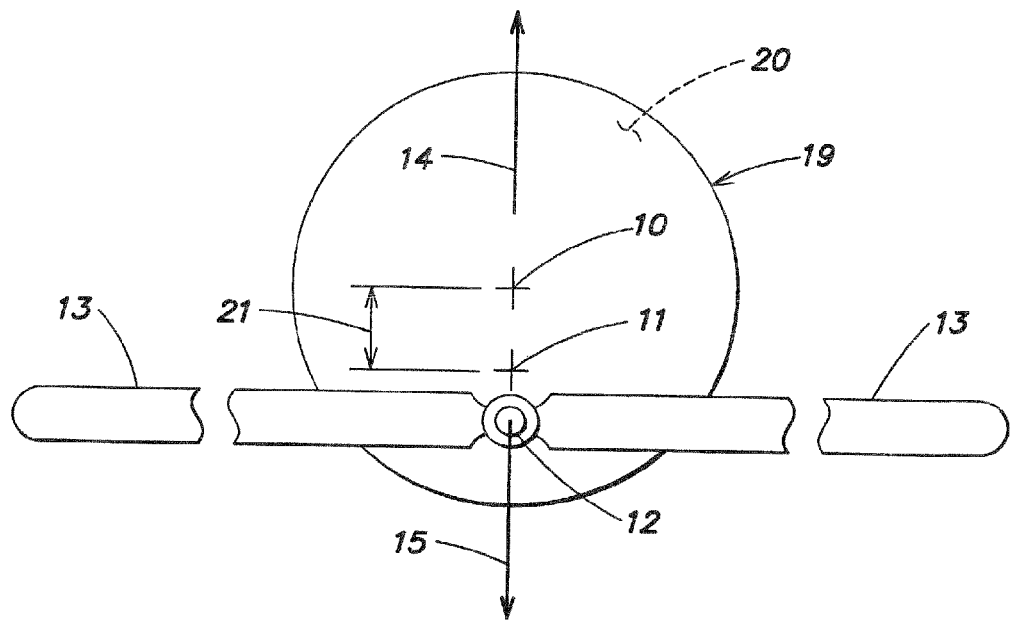
FIG. 1 is schematic front view partly in cross section of the system of the present invention when the wind turbine of the system is not rotating.
Figure 2:
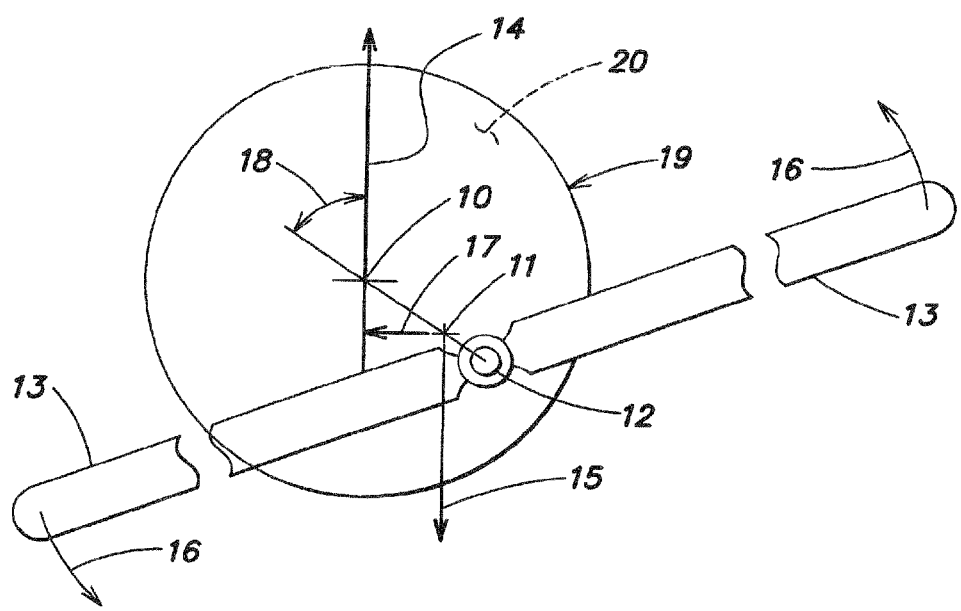
FIG. 2 is the system of FIG. 1 in an equilibrium state when the wind turbine is rotating.

Referring to the accompanying drawings, FIG. 1 and FIG. 2 are schematic drawings of the system of the present invention, many details are not shown in these drawings and are shown elsewhere and explained later, the purpose of these simple drawings is to explain the basic principles of the system of the present invention.

Reference 19 is a sealed cylindrical body; body 19 is filled with lighter than air gas 20, such as helium or hydrogen;

The system has two similar bodies 19, one of them is not shown in the drawings. The two bodies 19 are lighter than air and are generating a lift force 14 (14=L) which causes the system to be airborne in the atmosphere. The two bodies 19 are connected to each other rigidly by a shaft 12; the shaft 12 is placed below the symmetrical center of the two bodies 19; a wind turbine 13 is rotatably mounted to the shaft 12, in a way that allow the turbine 13 to rotate relative to the shaft 12. The turbine 13 is connected through transmission to a generator (the generator is not shown in these drawings), the generator is mounted rigidly and fixed to the shaft 12. The total weight of the floating system is 15 which is equal to mg. wherein m is the total mass of the system, and g is the gravity. 10 is the Center of Lift of the system, and 11 is the Center of Gravity of the system, (the center of lift and the center of gravity are defined above).

The lift force 14>15, (15 is the weight of the system), a tether, which is not shown in these drawings, controls the system altitude. When the turbine 13 is not rotating, the system will position itself in a way such that the center of gravity 11 will be vertically below the center of lift 10, (same as a pendulum). The distance between the points 10 and 11 is 21 (21=d). This position is shown in FIG. 1.

When the wind is blowing through the turbine 13, the blades of the turbine 13 will start to rotate in direction 16 as shown in FIG. 2; the turbine 13 will transfer the rotational motion to the generator, the generator while generating electricity will resist the transferred rotational motion, and as the generator is rigidly mounted to the shaft 12, the rotational torque of the turbine 13 will be transferred to the whole system through the shaft 12. The system will start rolling angularly in the same direction of the rotation of the turbine 13, and angle 18 (18=Alpha) will be opened between the line that connects point 10 to point 11, and the vertical direction. A returning torque will act on the system, this torque will be RT; the distance between the center of gravity point 11 and the vertical line that passes through the center of lift point 10, is 17 (17=d×Sine Alpha);

Therefore: $RT = mg \times d \times \text{Sine Alpha}$;

$RT \max = mg \times d \times 1 (\text{Sine } 90 = 1)$;

The torque that the turbine 13 is inducing on the system is: WT, if WT<RT max, the system will reach equilibrium when: 0<Alpha<90;

If WT>RT max, the system will keep rolling angularly and no electricity can be produced.

Figure 3:
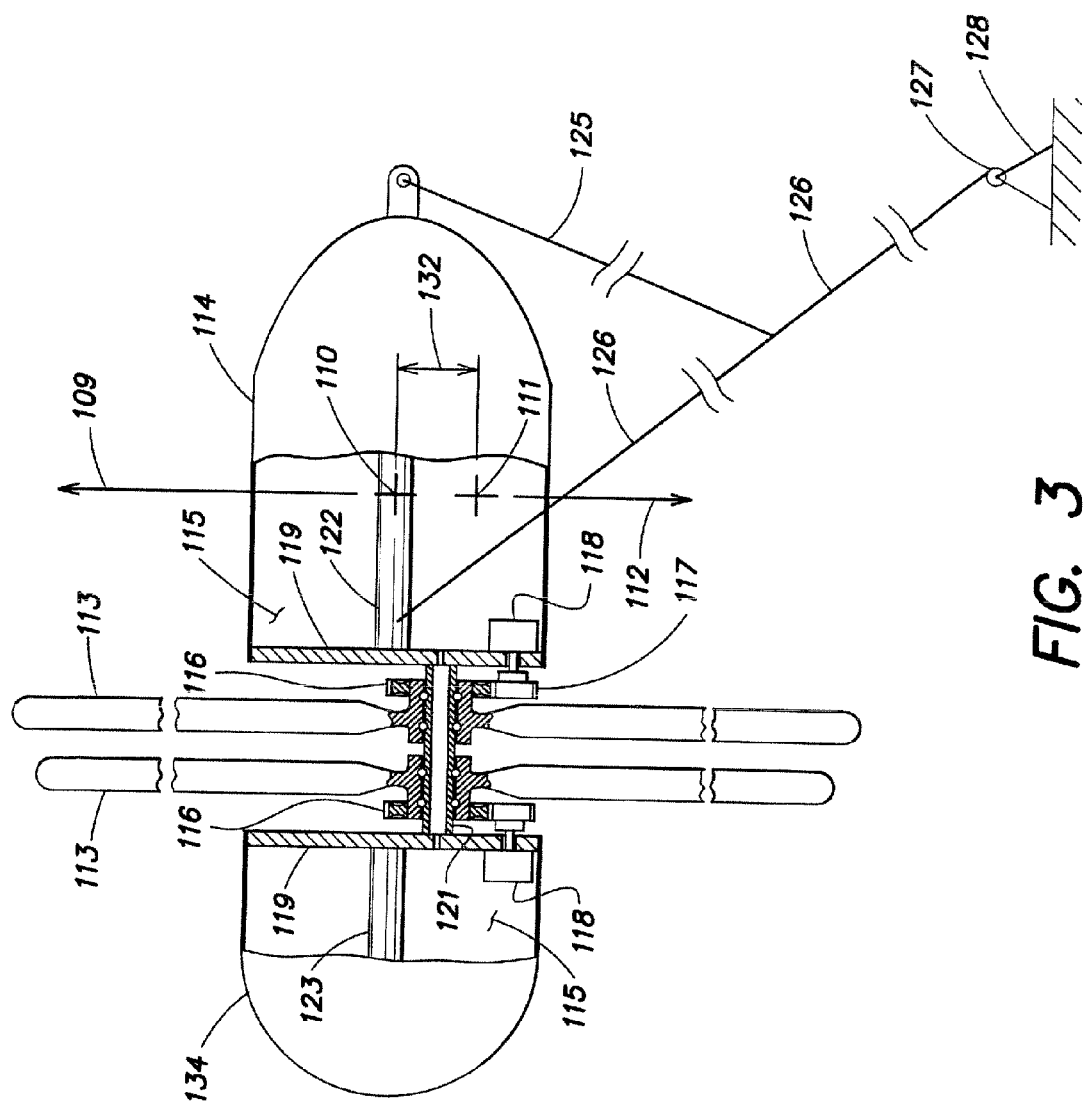
FIG. 3 is a side view partly in cross-section, of the first embodiment of a wind turbine system in accordance with the present invention.
Figure 4:
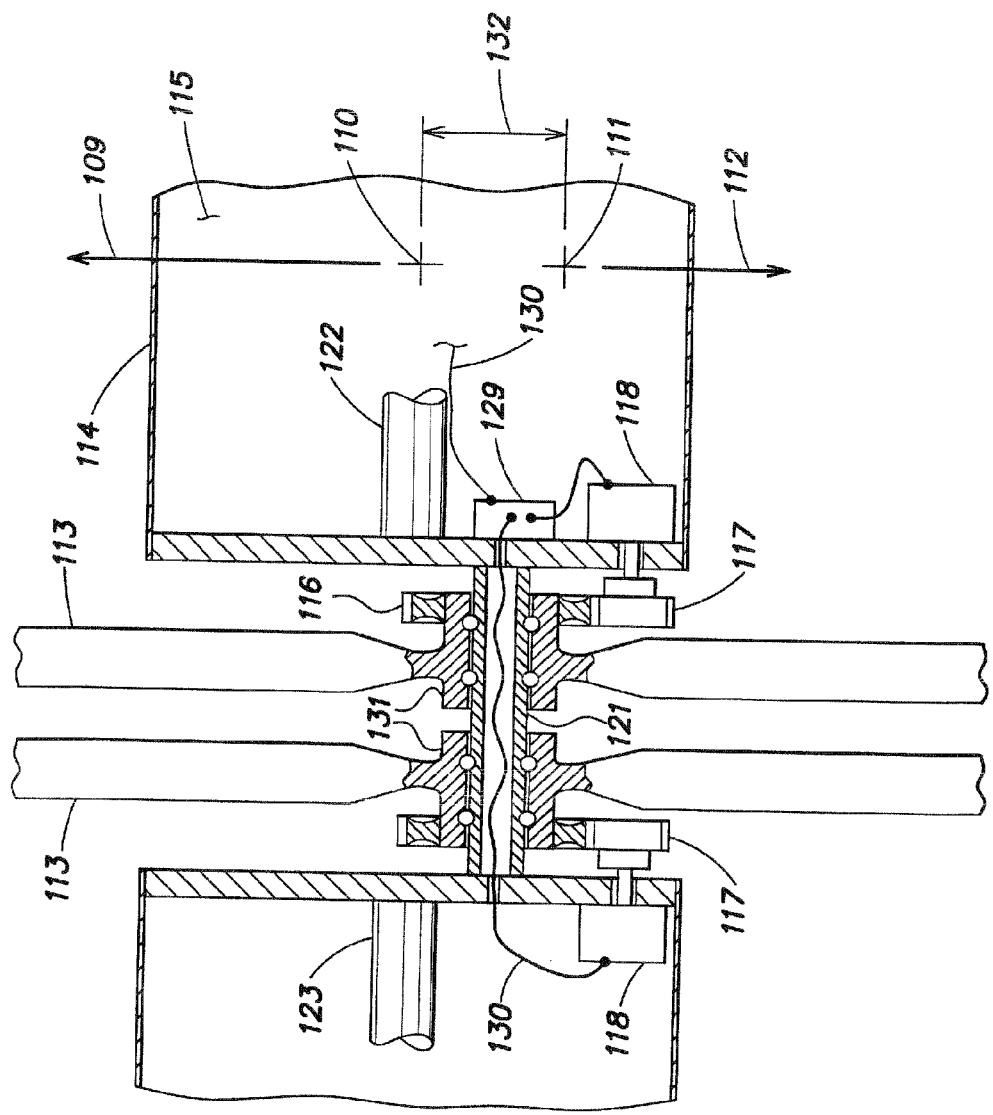
FIG. 4 is a detailed view partly in cross section, of the turbine section of the system shown in FIG. 3, when the system has two turbines.
Figure 5:
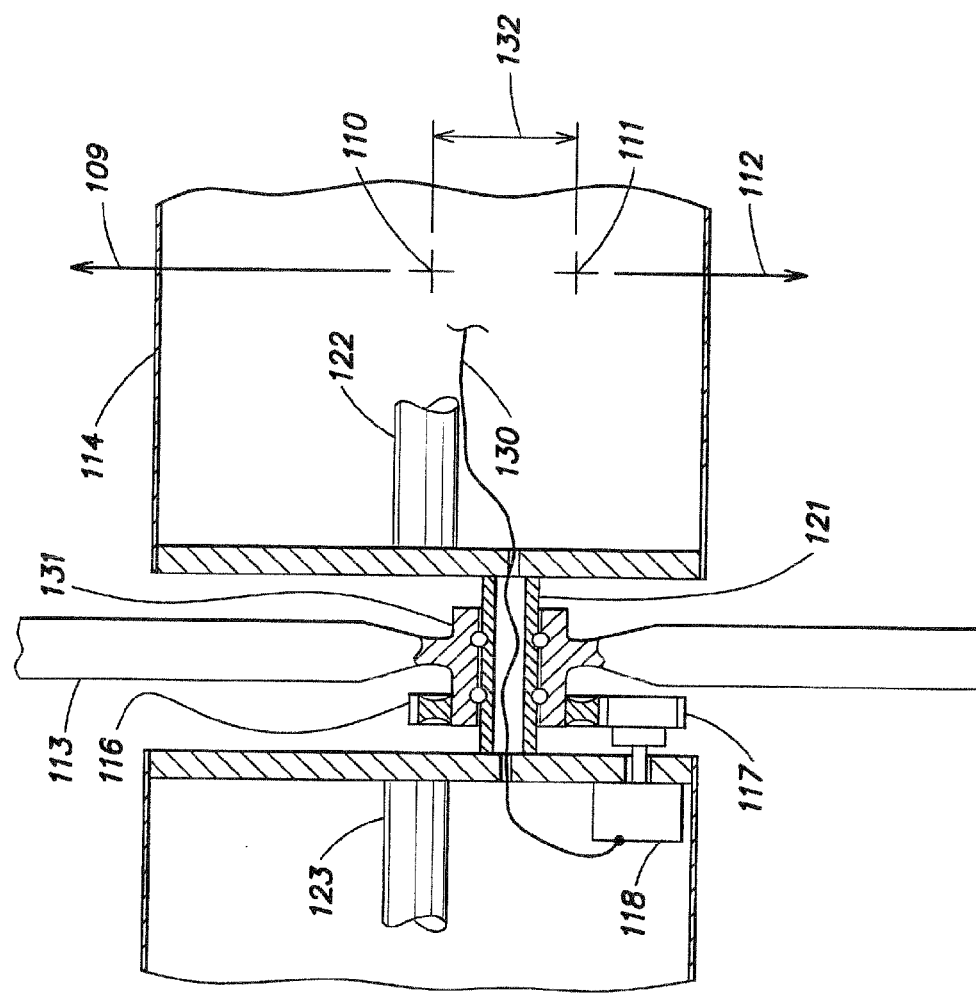
FIG. 5 is a detailed view partly in cross section, of the turbine section of the system shown in FIG. 3 when the system has one turbine.

FIG. 3 is a side view partly cross section of the first embodiment of the present invention; FIG. 4 and FIG. 5 are two versions of this first embodiment.

In FIG. 3, element 114 is a sealed inflatable front floating body; this body 114 is filled with lighter than air gas 115, this gas 115 can be helium, hydrogen, hot air, or any lighter than air gas; 134 is the rear inflatable floating body that is also filled with gas 115. These two floating bodies 114, 134 generate a combined lifting force 109; (109=L); the combined lifting force 109 can be consider as acting on the system through the center of lift point 110; the center of lift point has been defined above.

The total weight of the system is 112 (112=mg); the total weight of the system can be considered as acting through the center of gravity point 111; the center of gravity point has been defined above; the vertical distance between 110 and 111 is 132, (132=d); when the system's turbines 113 are in rest status. The system is floating in the air, therefore 109>112 (L>mg), the access lift force is balanced by the tethers 126 and 125; the tether 126 is connected to the anchoring base 128 through winch 127; winch 127 can adjust the operational altitude of the system. Element 122 is a structural beam that supports the body 114 and connects the system to the tethers 125 and 126; 122 is also connected, preferably rigidly, to the supporting wall 119; another supporting wall 119 is connected rigidly to the rear structural beam 123 that supports the rear floating body 134. A shaft 121 is mounted rigidly and fixed between the two supporting walls 119; the shaft 121 is placed vertically below the center of the supporting walls 119. The shaft 121 connects the front body 114 to the rear body 134.

Around the shaft 121, one or more than one, wind turbines 113 are rotatably mounted. FIG. 4 shows a detailed side view cross section of a version of this embodiment which includes two wind turbines; (more than two turbines can be included in this embodiment of the invention). FIG. 5 shows a detailed side view cross section of version of this embodiment which includes one wind turbine; the turbines 113 are assembled around the shaft 121 through bearings 131; the bearings 131 allow the turbines 113 to rotate around the shaft 121.

Generators 118 are mounted to the supporting walls 119; the generators 118 are connected to the turbines 113 through gear wheels 117 that are mounted rigidly to the generators shaft, and gear wheels 116 are mounted rigidly to turbines 113; the electricity produced by the generators while rotating passes by conductive wire 130 through the hollow shaft 121 to transformation unit 129, and from transformation unit 129 to the tether 126, and attached to tether 126 to the anchoring base 128, for usage or to energy storage. The electricity produced may also be used by the system, i.e., by one or more components on the system or stored on the system for future use by such components, the electricity may also be directed to the ground to a usage or storage system independent of the tether 126, i.e., via a cable that is not coupled to the tether 126.

The role of the transformation unit 129 is to collect the electricity from all generators 118 and to unify them to one output at a desired voltage. When the system includes one turbine, one or more than one generator can be used, this version is shown in FIG. 5.

When the turbines of the system are not rotating, the system will position itself in a way such that 111 (the center of gravity) is approximately vertically below 110 (the center of lift) When turbines 113 of this embodiment are exposed to wind, the airborne system will drift downwind in a way such that the shaft 121 will be substantially parallel to the wind direction. In the version shown in FIGS. 3 and 4, the two turbines will start to rotate relative to the shaft 121; each turbine will rotate in an opposite direction from the other turbine, as their blades have opposite angles of attack relative to the wind direction; each turbine will induce a rotating torque on the system through the generators. These torques will be WT1 and WT2, the two torques will act on the system in opposite directions and therefore they will balance each other. The difference between the two torques, will be WT3; (WT1−WT2=WT3). The whole system will start to rotate in the direction of WT3; angle Alpha will be opened between the vertical direction and the line between 110 and 111. As explained above, returning torque will act on the system in opposite direction of WT3; (same as in a pendulum). If WT3<mg×d; (mg=112; d=132), the system will reach equilibrium when: 0<angle alpha<90.

If the version of this embodiment includes one turbine as shown in FIG. 5, the torque that will be induced on the system by one turbine will be WT, and in this case, the system can reach equilibrium just if WT<mg×d; (mg=112; and d=132).

Figure 6:
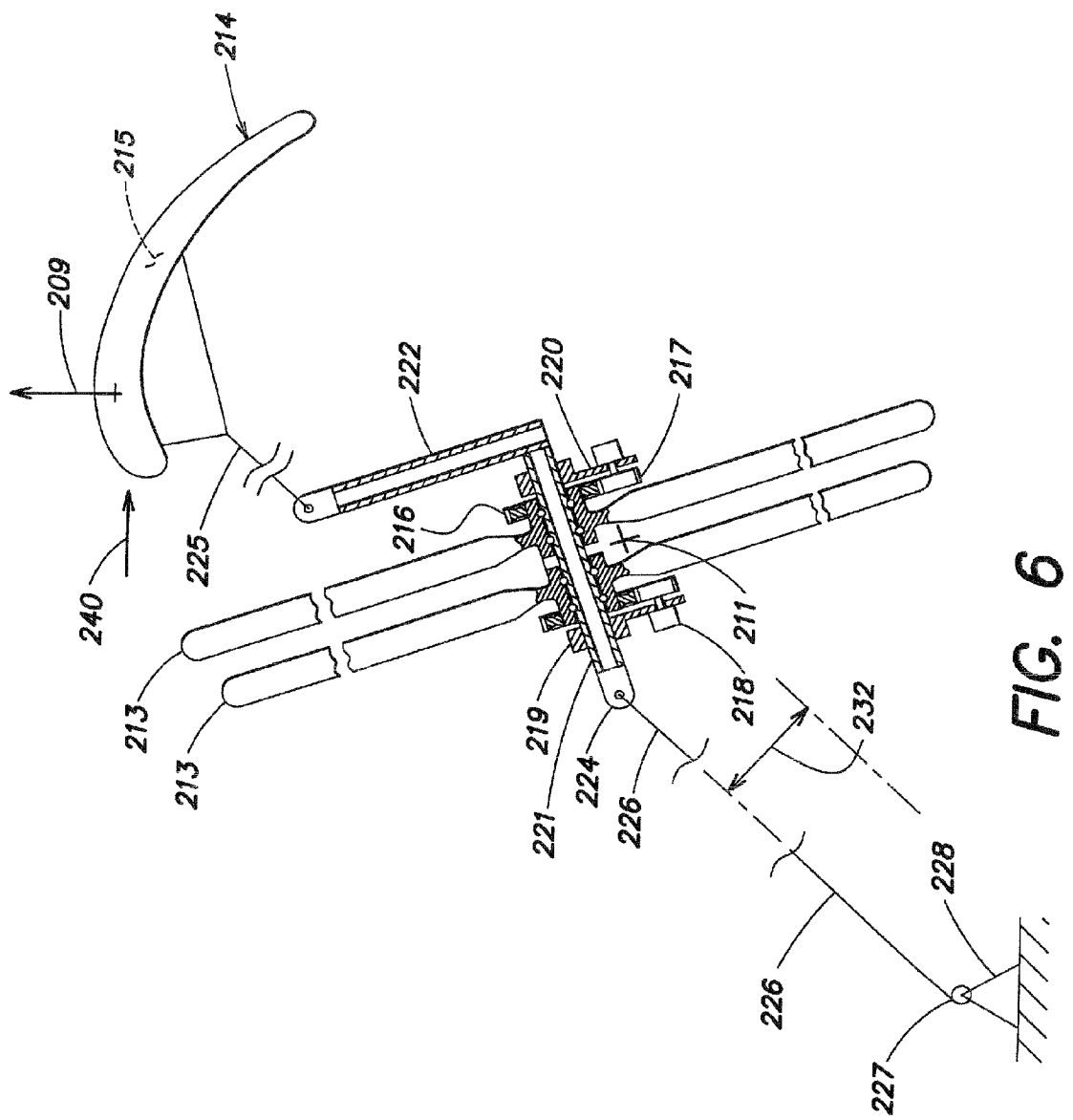
FIG. 6 is a side view partly in cross section of second embodiment of a wind turbine system in accordance with the present invention.
Figure 7:
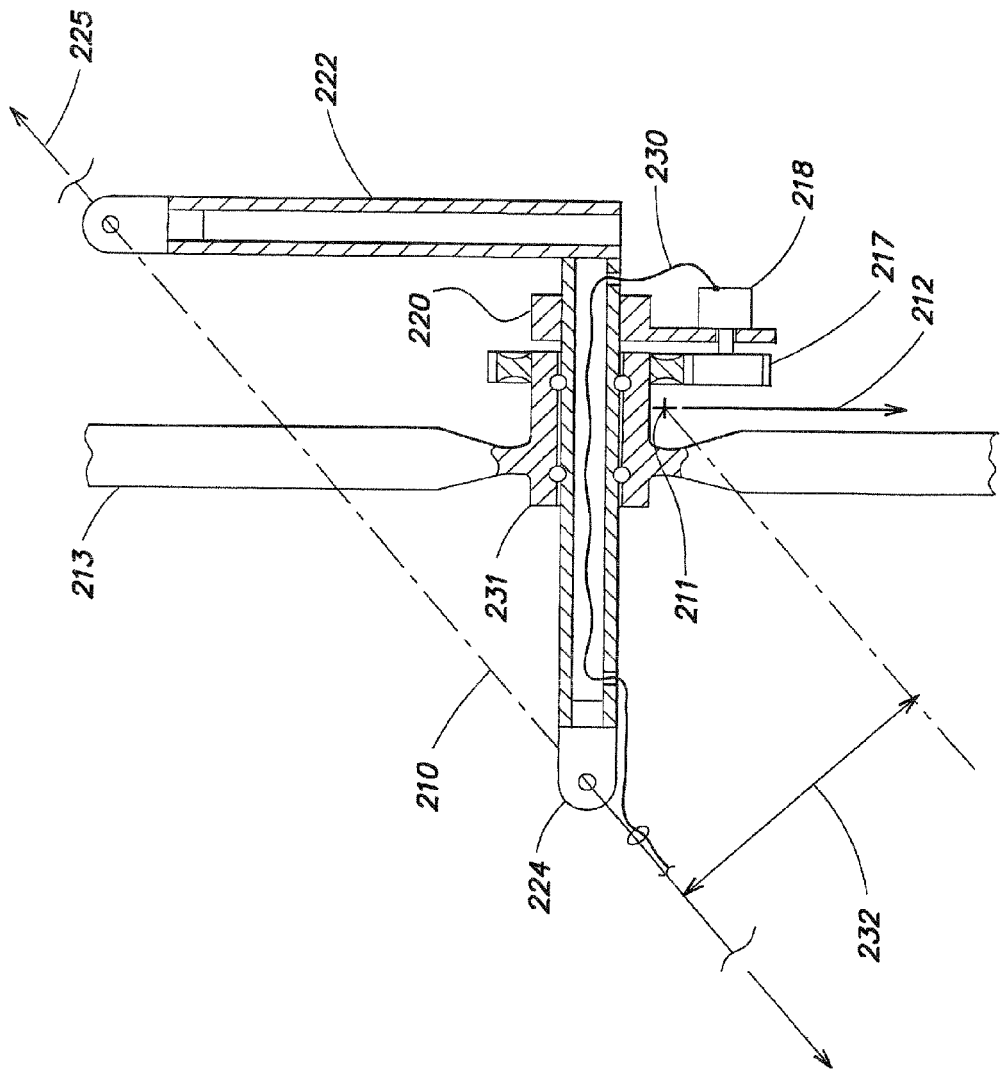
FIG. 7 is a detailed view partly in cross section of the turbine section of the system shown in FIG. 6 when the system includes one turbine.
Figure 8:
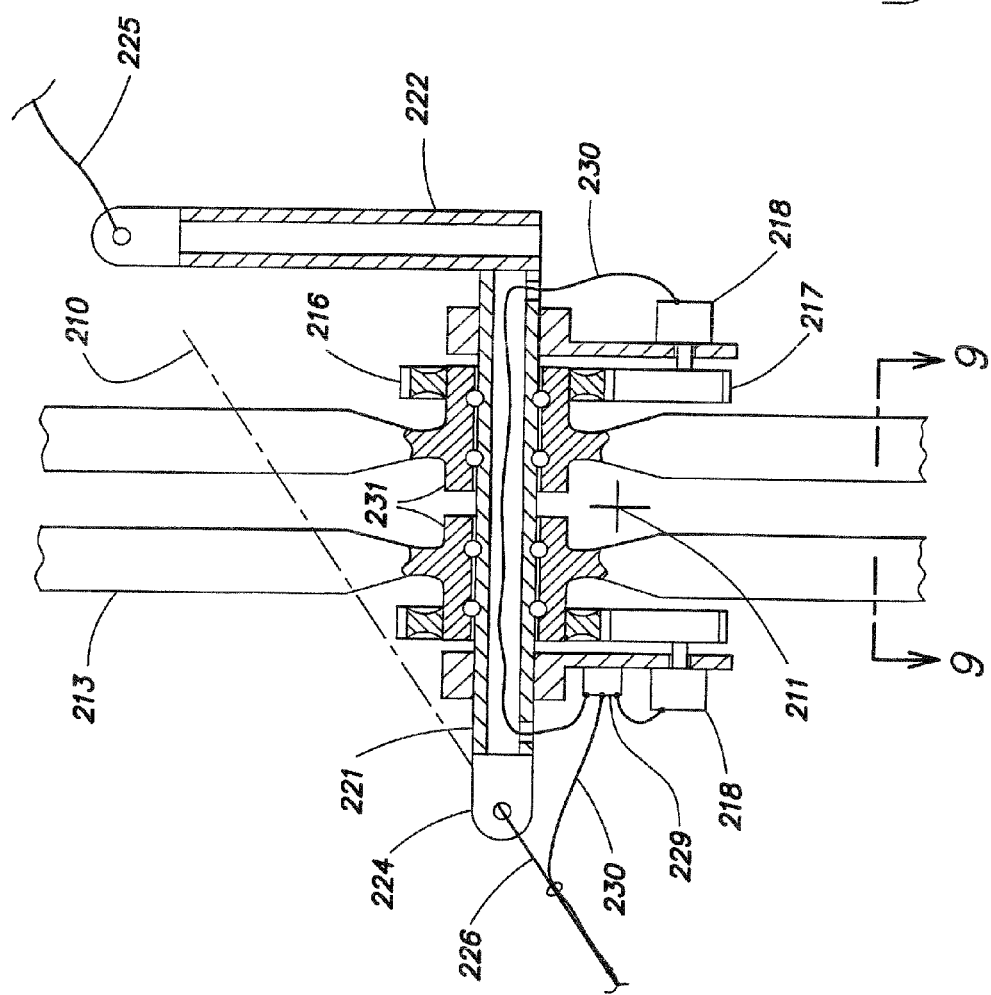
FIG. 8 is a detailed view partly in cross section of the turbine section of the system shown in FIG. 6 when the system includes two turbines.
Figure 9:
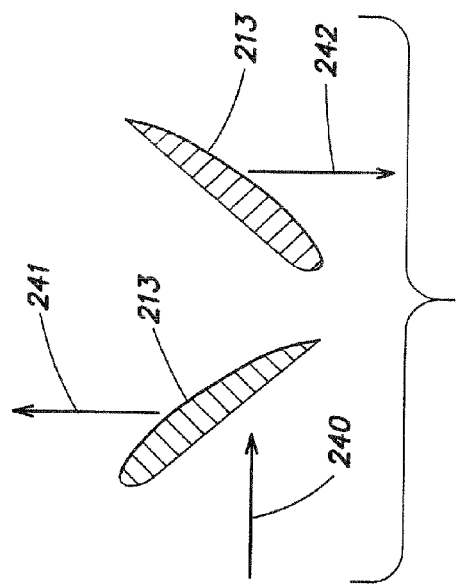
FIG. 9 is a cross section view along the line 3-3 of FIG. 8, this cross section view shown the opposite angle of attack of the blades of the two turbines shown in FIG. 8.

FIG. 6 is a side view partly in cross section of the second embodiment of the system of the present invention; FIG. 7 and FIG. 8 are two detailed side view partly in cross section versions of this second embodiment; FIG. 9 is a detailed cross section of the turbines blades shown in FIG. 8.

In this second embodiment of the invention, the wind turbine section includes at least one wind turbine, but can include a few wind turbines wherein part of them will rotate in the opposite direction from the rest. The turbine section of this embodiment is connected by a tether to the lifting section, and by another tether to the anchoring section.

The lifting section: 214 is a lifting body that is filled with lighter than air gas 215, like helium, hydrogen, hot air or any other lighter than air gas. The lifting body 214 has an aerodynamic shape so when the wind 240 is blowing over the lifting body 214, there is an additional lifting force acting on the lifting body 214. The lifting body 214 is connected to the turbine section of the system through a tether 225.

In the turbine section, 221 is the main shaft, this is preferably a cylindrical hollow tube that gives a constructional strength to the turbine section; it is made preferably from composite material or from other structural light material. The turbines 213 are rotatably mounted around main shaft 221 through a bearing assembly 231, in a way such that they can rotate around the main shaft 221. A beam 222 is mounted and fixed, e.g., rigidly and substantially perpendicular, to the rear end of the main shaft 221; the other end of beam 222 is connected to the tether 225 and through tether 225 to the lifting body 214. Element 220 is a rear supporting element that is mounted rigidly and fixed to the main shaft 221; 219 is a front supporting element that is mounted rigidly and fixed to the main shaft 221; on these two supporting elements, two electricity generators 218 are mounted. The generators 218 are connected to the turbines 213 through transmission wheels 217 that are mounted rigidly to the generators shafts, and 216 that are mounted rigidly to the turbines 213. When the turbines 213 are rotating, the rotation is transmitted to the generators 218 through the transmission wheels 217 (any other transmission type, like transmission belts can be used in order to transmit the rotation of the turbines 213 to the generator 218). Element 224 is a connecting element at the front end of 221; the tether 226 is connecting the turbine section to the anchoring base 228, through the winch 227. The winch 227 can control the operational altitude of the system. Attached to the tether 226 is the wire 230. Wire 230 conducts the electricity produced by the generators 218 and passes through the transformation unit 229. The role of the transformation unit 229 is to collect the electricity that has been generated by all generators 218 and to unify them to one electrical output at a desired voltage.

The center of gravity of the turbine section is 211; the lift that is generating by the lifting section is 209; the line of tension 210 is the line between the two points that connect the turbine section to the tethers 225 and 226, (the center of gravity and the line of tension has been defined above). The distance between the center of gravity of the turbine section 211 and the line of tension 210 is 232, (232=d).

When the turbines 213 are not rotating, the system will position itself in a way such that the center of gravity 211 will be approximately vertically below the line of tension 210 (as a pendulum).

When turbines 213 are exposed to wind 240, the system will drift downwind and the turbines 213 will start to rotate. In the version of the embodiment that is shown in FIG. 6 and FIG. 8, the two turbines 213 will rotate in opposite directions because the blades of the two turbines 213 have an opposite angle of attack relative to the wind direction 240, this is shown in FIG. 9, when the front turbine will rotate to direction 241 and the rear turbine will rotate to direction 242.

Each turbine 213 will induce rotational torque on the shaft 221 through the generators 218. These torques will be WT1 and WT2; these two torques act in opposite direction from each other and therefore they partially balance each other. The differential in the opposite torques will be WT3. As explained before, the turbine section will start rolling angularly around the line of tension 210; angle Alpha will be opened between the vertical plane that passes through line of tension 210 and the plane that passes through point 211 (the center of gravity) and line of tension 210. Returning torque will act on the turbine section of the system in the opposite direction of WT3. This returning torque will be RT, equal to:

$$RT = mg \times d \times \text{Sine Alpha}; (mg=212; d=232);$$

If WT3<mg×d×1, (Sine 90=1), the system will reach equilibrium when 0<Alpha<90.

If WT3>mg×d, no equilibrium can be achieved and the system will keep rolling angularly, and electricity cannot be produced.

It is important to understand that the turbine section can include any number of turbines and if, after balancing each other's torque, the resultant torque will be WT3, the above calculation is valid.

FIG. 7 shows a version of this embodiment of the invention, where the turbine section includes one wind turbine; the torque that this turbine is inducing on the shaft 221 through the generator 218 is WT.

As explained above, if WT<mg×d×1, equilibrium can be achieved when: 0<Alpha<90; if WT>mg×d, no equilibrium can be achieved and the system will keep rolling angularly around line of tension 210. In this case, no electricity can be produced by the system. To make the above description clearer here are some calculations for the version of the embodiment shown in FIG. 8.

In the following example, the front turbine 113 has an output of 1.5 megawatt and the rear turbine 113 has an output of 1.25 megawatt, (the total output of the system=2.75 MW). The turbines are rotating at a velocity of 10 rpm.

The total weight of the turbine section is 10 metric tons; the distance 232 is 5 meters (d=5 meters), therefore:

The angular velocity of the turbines is: 10×2×3.14/60=1.047 radian/second;

The torque that the front turbine is inducing on the shaft 221 is WT1;

As: torque×angular velocity=power;

$$WT1 = 1.5 \text{ megawatt}/1.047 = 1.43 \text{ mega Newton} \times \text{meter}$$

The torque that induced on the shaft by the rear turbine 113 is WT2;

$$WT2 = 1.25 \text{ megawatt}/1.047 = 1.19 \text{ mega Newton} \times \text{meter};$$

As the two torques act in opposite directions, the net torque acting on the shaft 221 is WT3; WT3=WT1−WT2=(1.43−1.19) mega Newton×meter=0.24 mega Newton×meter. When this torque is acting on the shaft 221, the turbine section of this version of the invention, will rotate in the torque direction, angle Alpha will be opened between the vertical plane that passes through line 210 and the plane that passes through point 211 and the line 210, resulting returning torque; this returning torque will be RT; RT=mg×d×Sine Alpha; as mg=10,000×9.8=98000 and d=5 meter;

At equilibrium position WT3=RT=0.24 mega Newton× meter=240,000 Newton×meter.

Therefore, sine Alpha at the equilibrium position of the turbines section will be:

Sine Alpha(at equilibrium=RT/mg×d=WT3=240,000/490000=0.49;

Therefore, the angle at which the system will reach equilibrium will be approximately 30 degree;

(Sine 30=0.5)

Figure 10:
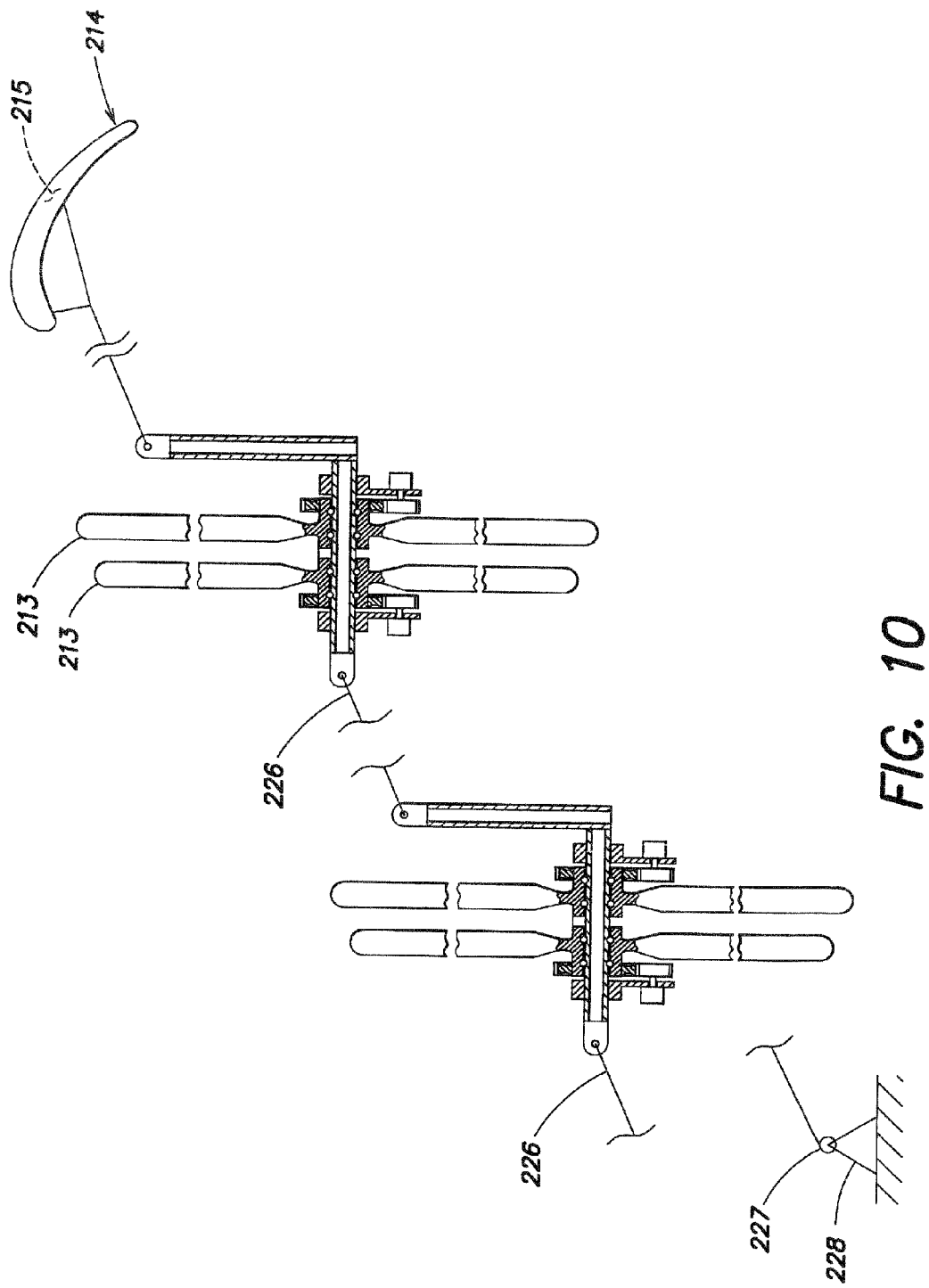
FIG. 10 is a side view partly in cross section of another embodiment of an airborne wind turbine system in accordance with the present invention.

FIG. 10 is a side view partly cross section of the third embodiment of the present invention.

In this embodiment, there are a plurality of turbines sections that are connected by tether 226 in a serial formation. The upper turbines section is connected to the lifting section, and lower turbines section is connected to the anchoring base 228 preferably through winch 227 that can control the operational altitude of the plurality of turbine sections.

Each turbine section, the lifting section, and the anchoring base are similar to those shown in FIGS. 6-8.

The advantages of this embodiment are: harvesting of wind energy in multiples altitudes by the same system; the cost of electricity output will be lower.

The disadvantage is: the system is more complicate to control and to maintain.

Figure 11:
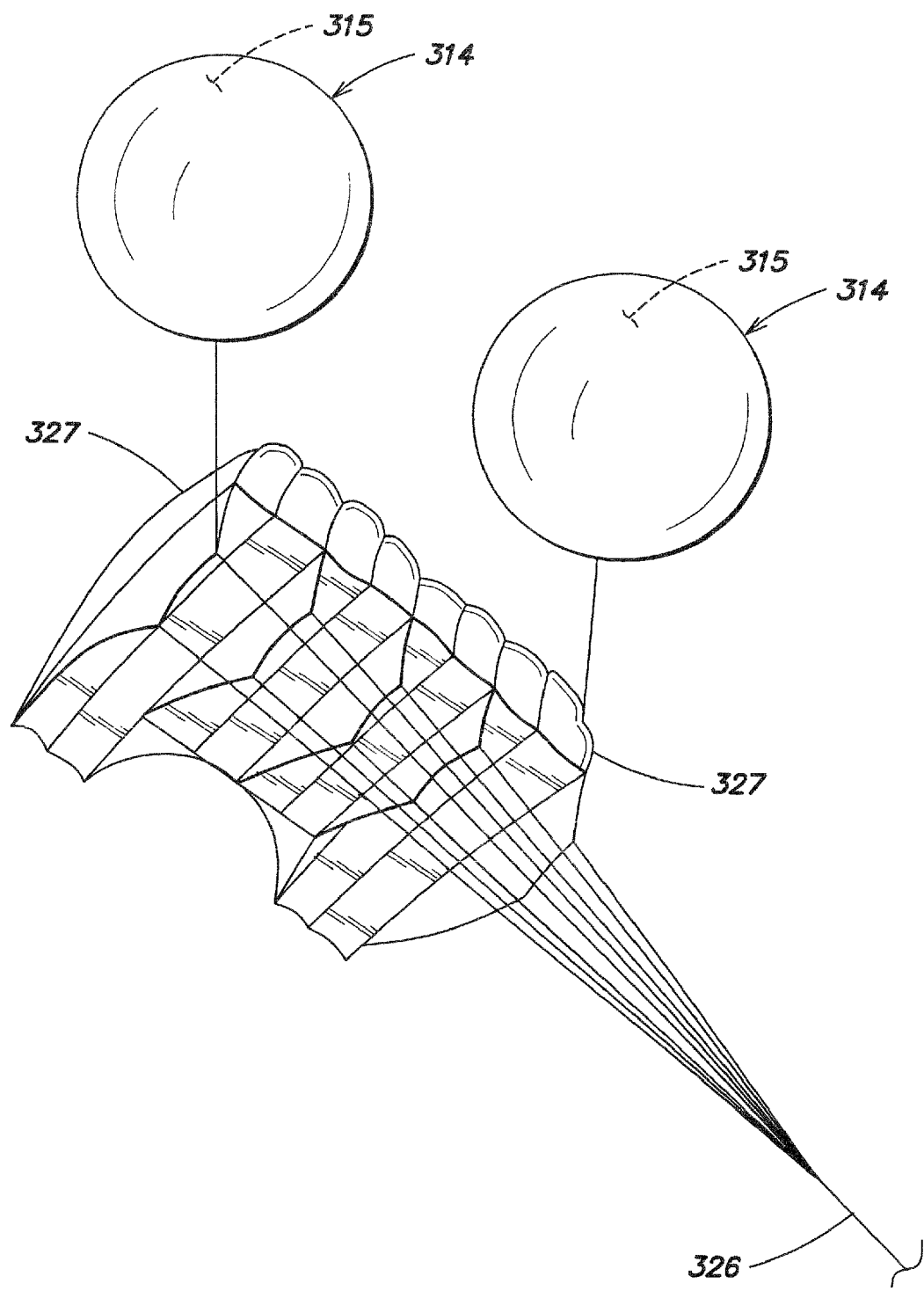
FIG. 11 is a detailed drawing of a version of a lifting section of a wind turbine system in accordance with the present invention.

FIG. 11 shows a possible lifting section that can generate the lifting force to the airborne system, in different embodiments of the invention.

Element 327 is an air foil lifter kite; 314 are inflatable sealed balloons, 315 is lighter than air gas that is filled the balloons 314.

The combined lifting force of the balloons and the kite are generating the lifting force for the turbine sections of the systems of the present invention through the tether 326.

Using a kite alone as the source of the lifting force of the system, or using lighter than air balloons alone as the source of the lifting force of the system is possible.

The advantage of combined lifting section like the one shown in FIG. 11 is that it will operate better in all level of wind velocities. When the wind velocity is low, the balloon will generate the main lifting force, when the wind velocity is higher, the balloons will drift stronger downwind and the system can lose altitude, but the air foil kite will generate more lifting force at high wind velocity and will make the control of the system altitude, and the angle of the tether 326 more controllable. A unify body which include the aerodynamic properties of a kite, with the floating properties of lighter than air balloon is possible and shown as item 214 in FIG. 6.

Figure 12:
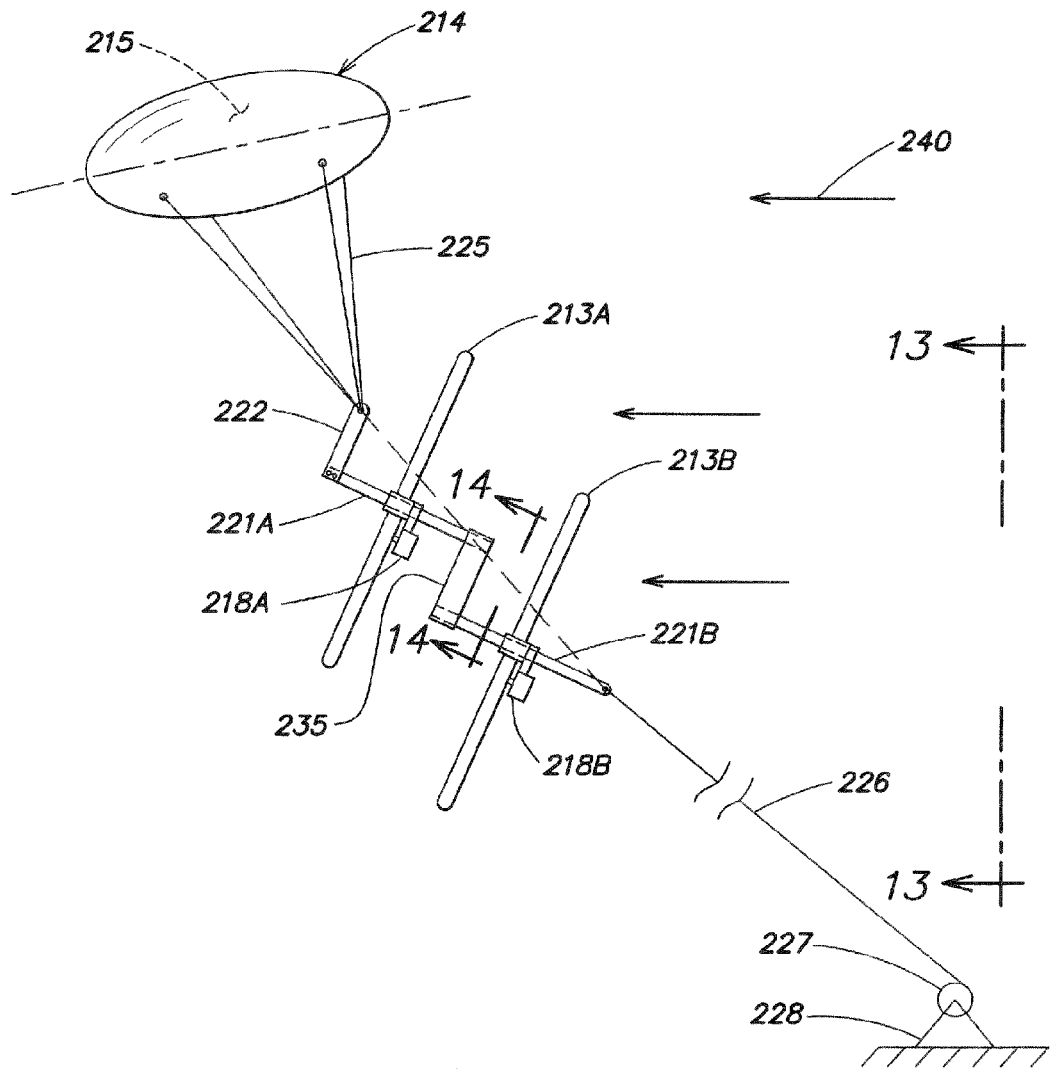
FIG. 12 is a side view of another embodiment of a wind turbine system in accordance with the invention.

FIG. 12 shows another embodiment of the invention wherein there are two turbine sections that are connected together by a torque transfer mechanism 235, such as a mechanical connection, a connecting member, a connecting bar or other torque transferring connection. The torque transfer mechanism 235 may be made of metal, rubber, plastic, combinations thereof, or other any material or combination of materials that enables torque to be transferred between one turbine section connected to one side thereof and another turbine section connected to the other side thereof. The torque transfer mechanism 235 may be made as a single piece of material or from a number of different pieces and attached together.

A first turbine section includes a shaft 221A about which one or more turbines 213A rotate (only one turbine being shown), and a generator 218A coupled to the turbine 213A to produce electricity as the turbine 213A rotates about the shaft 221A. Similar to the embodiment shown in FIG. 6, a beam 222 is mounted and fixed to the rear end of the shaft 221A; the other end of beam 222 is connected to one or more tethers 225 and through tether(s) 225 to the lifting body 214. Beam 222 could be, but is not required to be, mounted rigidly and substantially perpendicular to the rear end of the shaft 221A.

A second turbine section includes a shaft 221B about which one or more turbines 213B rotate (only one turbine being shown), and a generator 218B coupled to the turbine 213B to produce electricity as the turbine 213A rotates about the shaft 221B. The lower turbine section is connected to the anchoring base 228 preferably through a tether 226 controlled by a winch 227 that can thus control the operational altitude of the plurality of turbine sections.

In other respects, each turbine section, the lifting section, and the anchoring base are similar to those shown in FIGS. 6-8. For example, a single transformation unit may be provided to conduct electricity from the generators of the turbines sections though one or more common conductors or wires for usage and/or storage. Although only a single turbine is shown on each shaft 221A and 221B, any number of turbines may be mounted on each shaft.

Moreover, although FIG. 12 shows only two turbine sections, a wind turbine system in accordance with this embodiment of the invention may include three or more turbine sections, each including a shaft, one or more turbines, etc. In each case, a torque transfer mechanism 235 is arranged between adjacent turbine sections. A series of wind turbine sections could therefore be provided with a single lifting section connected, for example, to the uppermost turbine section and single anchoring section connected, for example, to the lowermost turbine section. Thus, a wind turbine system with three turbine sections would include two torque transfer mechanisms.

However, in this embodiment, the shafts 221A and 221B are offset from one another by the torque transfer mechanism 235 to increase the exposure of the turbines 213A and 213B to the wind 240.

Figure 13:
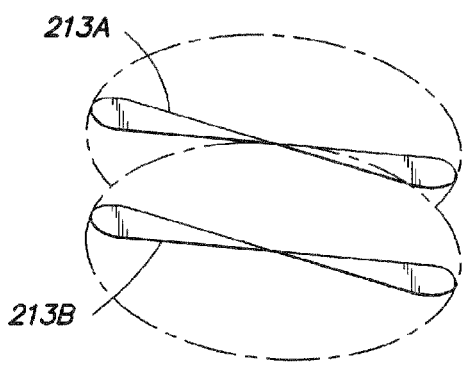
FIG. 13 is a view of the wind turbine system of FIG. 12 taken along the line 13-13.

FIG. 13 shows the effect of the offset of the rotational axes of the shafts 221A and 221B as reflected by significantly increased viewing of the rotation of the turbines 213A, 213B. A larger length of the torque transfer mechanism 235 will result in a larger offset in the rotational axes of the shafts 221A, 221B by the torque transfer mechanism 235 and thus more exposure of the turbines 213A, 213B to the wind.

Figure 14:
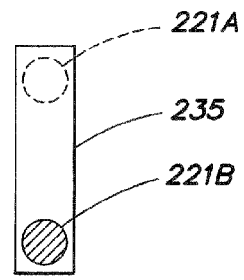
FIG. 14 is across sectional view taken along the line 14-14 of FIG. 12.

The torque transfer mechanism 235, or any similar structural connecting member or members that connect the shafts 221A, 221B, may be a solid rod as shown in FIG. 14 or have other forms. In one embodiment, the shafts 221A, 221B and torque transfer mechanism 235 may be formed in an integral manner as a single piece. Otherwise, if formed as separate components, the shafts 221A, 221B and torque transfer mechanism 235 are connected together in such a manner to ensure the capability of the torque transfer mechanism 235 to transfer torque from one turbine section including shaft 221A at one side of the torque transfer mechanism 235 to another turbine section including shaft 221B on the opposite side of the torque transfer mechanism 235. Collectively, the shafts 221A and 221B will therefore be referred to as a shaft section that provides at least two offset shaft portions.

Also, in this embodiment, the turbine(s) 213A on the shaft 221A and the turbine(s) 213B on the shaft 221B are mounted to rotate in opposite directions, and otherwise configured, to improve the angular equilibrium of the system in that a resultant torque arising from the torque induced on the shaft 221A by rotation of turbine(s) 213A and the torque induced on the shaft 221B by rotation of turbine(s) 213B may be of substantially equal magnitude and opposite in direction. As such, the torque generated by rotation of the turbine(s) 213A will balance the torque generated by rotation of the turbines 213B thereby facilitating angular stability of the system. The number of turbines sections, the size of the turbines, the number of turbines and the offset between the rotational axes of the shafts of the turbines sections may be adjusted as desired to optimize exposure of the turbines to wind while providing for and ideally maintaining angular stability of the system.

Any of the systems described above can be constructed to operate over land or offshore, over a body of water. Moreover, the systems are easily can operate in various altitudes to maximize the exposure of the systems to high velocity winds. An offshore operation in which the system is mounted to a floating rig on a body of water is likely to be cheaper and easier to implement than existing offshore wind-based electricity generating systems which are mounted on towers because the system in accordance with the invention requires only an anchoring point on the ocean floor, or on a floating rig, with no other constructions.

It is to be understood that the present invention is not limited to the embodiments described above, but include any and all embodiments within the scope of the following claims. While the invention has been described above with respect to specific apparatus and specific implementations, it should be clear that various modifications and alterations can be made, and various features of one embodiment can be included in other embodiments, within the scope of the present invention.

The invention claimed is:

1. An airborne system for producing electricity from wind energy, comprising:
   at least one turbine section, each of the at least one turbine section comprising:
     a shaft;
     at least one turbine rotatably mounted to said shaft and arranged to rotate when exposed to a wind; and
     at least one generator coupled to the at least one turbine and arrange to convert rotation of the at least one turbine into electricity;
   a lifting section connected to part of the at least one turbine section for generating a lifting force to cause the at least one turbine section to be airborne at a desired altitude;
   a tether;
   an anchoring section connected by the tether to another part of the at least one turbine section to anchor the at least one turbine section to a base relative to the earth; and
   a conductor that conducts electricity that is generated by the at least one generator to an energy usage or an energy storage system;
   wherein the at least one turbine section is constructed such that the center of gravity of the at least one turbine section is approximately in the lowest possible position relative to a substantially straight line between the part of the at least one turbine section connected to the lifting section and the part of the at least one turbine section connected to the anchoring section, while the at least one turbine is at rest;
   wherein the at least one turbine rotates when exposed to wind and causes rotational torque to be induced on the at least one turbine section, that causes an angular deviation of the center of gravity from its lowest possible position;
   wherein the angular deviation of the center of gravity causes a returning torque that increases with an increase of the angular deviation;
   wherein the returning torque acts on the at least one turbine section, causing the at least one turbine section to reach a stabilized angular position.

2. The system of claim 1, wherein the at least one turbine section comprises:
   at least first and second turbines, the first turbine rotating in a first direction and the second turbine rotating in a second direction opposite to the first direction when exposed to the same wind,
   wherein the first and second turbines rotating in opposite directions induce opposite rotational torques on the at least one turbine section;
   wherein a differential torque from the opposite rotational torques of the first and second turbines is induced on the at least one turbine section, causing an angular deviation of the at least one turbine section from the rest angular position;
   wherein the angular deviation causes a returning torque which increases with an increase of the angular deviation; and
   wherein the returning torque balances the induced differential torque and causes the at least one turbine section to be angularly stable, while the generators of the system are rotating and generating electricity.

3. The system of claim 1, wherein the lifting section comprises at least one sealed inflatable body that is filled with lighter than air gas.

4. The system of claim 3, wherein the lighter than gas air is helium or hydrogen.

5. The system of claim 1, wherein the tether is made from a composite material.

6. The system of claim 1, wherein the lifting section comprises at least one aerodynamic kite that generates the lifting force that causes the system to be airborne at the desired altitude.

7. The system of claim 1, wherein the lifting section comprises at least one inflatable body filled with lighter than air gas and at least one kite.

8. The system of claim 1, wherein the at least one turbine section comprises a plurality of turbine sections, further comprising a torque transfer mechanism arranged between each adjacent pair of turbine sections to connect the adjacent pair of turbine sections together in a serial manner to enable the turbine sections to harvest wind energy at different altitudes.

9. The system of claim 8, wherein each torque transfer mechanism comprises a member that offsets rotational axis of the shaft of the connected pair of turbine sections.

10. The system of claim 9, wherein the plurality of turbine sections comprises first and second turbine sections, the at least one turbine in the first turbine section rotating in one direction and the at least one turbine in the second turbine section rotating in an opposite direction.

11. The system of claim 10, wherein the at least one turbine of the first turbine section is configured relative to the at least one turbine of the second turbine section such that a resultant torque arising from the torque induced on the shaft of the first turbine section and the torque induced on the shaft of the second turbine section are of substantially equal magnitude and opposite in direction.

12. The system of claim 11, wherein the first and second turbine sections each include only a single turbine.

13. The system of claim 1, wherein the at least one turbine section comprises a first turbine section and a second turbine section, further comprising a torque transfer mechanism that connects the first and second turbine sections together, the at least one turbine in the first turbine section rotating in one direction and the at least one turbine in the second turbine section rotating in an opposite direction, the at least one turbine of the first turbine section being configured relative to the at least one turbine of the second turbine section such that a resultant torque arising from the torque induced on the shaft of the first turbine section and the torque induced on the shaft of the second turbine section are of substantially equal magnitude and opposite in direction.

14. The system of claim 13, wherein the torque transfer mechanism is configured to offset a rotational axis of the shaft of the first turbine section from a rotational axis of the shaft of the second turbine section.

15. The system of claim 13, wherein the first and second turbine sections each include only a single turbine.

\* \* \* \* \*